United States Patent [19]

Kubota et al.

[11] Patent Number: 4,623,246
[45] Date of Patent: Nov. 18, 1986

[54] PHOTOGRAPHIC PRINTING APPARATUS

[75] Inventors: Kazufumi Kubota; Kanji Tokuda, both of Kanagawa, Japan

[73] Assignee: Fuji Photo Film Co., Ltd., Kanagawa, Japan

[21] Appl. No.: 764,147

[22] Filed: Aug. 9, 1985

[30] Foreign Application Priority Data

Aug. 29, 1984 [JP] Japan ............................. 59-179785
Oct. 5, 1984 [JP] Japan ............................. 59-209536
Oct. 5, 1984 [JP] Japan ............................. 59-209537
Oct. 5, 1984 [JP] Japan ............................. 59-209540

[51] Int. Cl.⁴ .................................. G03B 27/80
[52] U.S. Cl. ..................... 355/38; 354/431; 355/68
[58] Field of Search ............ 355/38, 68; 354/431, 354/480

[56] References Cited

U.S. PATENT DOCUMENTS

3,263,556 8/1966 Mey ................................. 355/38
3,649,118 3/1972 Yano et al. ..................... 355/38
3,791,276 2/1974 Ueda et al. .................... 354/431

Primary Examiner—Richard A. Wintercorn
Attorney, Agent, or Firm—Sughrue, Mion, Zinn, Macpeak & Seas

[57] ABSTRACT

A photographic printing apparatus for printing an image formed on a negative film on photographic paper includes a shutter disposed between the photographic paper and an enlarging lens. A reflective surface is provided on the surface of the shutter on the side thereof which is closer to the enlarging lens. A light receiver is disposed outside the optical path of exposure light in such a manner as to face the reflective surface. When the shutter is closed, the light receiver receives the light which forms an out-of-focus image at the reflective surface and is reflected therefrom. Accordingly, it is possible to measure an averaged density of the film image.

23 Claims, 7 Drawing Figures

FIG. 7

PHOTOGRAPHIC PRINTING APPARATUS

BACKGROUND OF THE INVENTION

1. Field of the Invention

The present invention relates to a photographic printing apparatus which accurately measures the density of an image formed on a photographic film by a reduced number of light receivers and then prints the image on photographic paper.

2. Description of the Prior Art

Photographic printing is generally effected in such a manner that the light from a light source is passed through a negative film and an enlarging lens, and the image on the film is formed on photographic paper. The exposure time for a photographic printing operation is determined by detecting the quantity of light passing through a negative film by means of a light receiver.

One example of conventional practices is to dispose a light receiver on the side of a negative film which is closer to an enlarging lens and outside the optical path of exposure light in such a manner that the light receiver faces the negative film. In another example of conventional practices, a specular surface is provided on the upper surface of a shutter which is disposed between a negative film and an enlarging lens, and a light receiver is disposed outside the optical path of exposure light in such a manner as to face a specular image on the specular surface (see the specification of Japanese Patent Laid-Open No. 10943/1984).

However, the respective densities of various portions of an image on a negative film are not generally uniform, and the distribution of density may be distorted to a substantial degree. In such a case, the quantity of the light passing through the image on the film differs depending upon the direction in which the light quantity is measured. For this reason, to accurately measure the density of the whole of a film image, it is necessary to dispose an unfavorably large number of light receivers around the optical path of exposure light and to average the quantities of light which are respectively received by these light receivers.

Thus, a reduction in the number of light receivers disposed (e.g., one or two light receivers for each of the three primary colors) disadvantageously results in an inaccurate measurement of density, while an increase in the number of light receivers employed unfavorably leads to a complicated photometric system and an increase in the production cost.

SUMMARY OF THE INVENTION

Accordingly, it is a primary object of the present invention to provide a photographic printing apparatus which eliminates the above-described disadvantages.

To this end, the invention provides a photographic printing apparatus in which a reflective surface (including a specular surface and a non-specular surface) is provided on the surface of a shutter, disposed between an enlarging lens and photographic paper, on the side thereof which is closer to the enlarging lens, and a light receiver is provided outside the optical path of exposure light in such a manner as to face the reflective surface.

By virtue of the above-described arrangement, when the shutter is closed, the light passing through a developed film and the enlarging lens is reflected by the reflective surface of the shutter, and then the light receiver receives the light reflected from the reflective surface, the light forming an out-of-focus image at the reflective surface. Accordingly, it is possible for even a single light receiver to measure a LATD (large area transmittance density) of a film image, and the measured LATD is hardly affected by the disposition (directional orientation) of the light receiver.

If the reflective surface is constituted by a non-specular surface, it is possible to measure a farther averaged density of a film image.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Embodiments of the photographic printing apparatus according to the present invention will be described hereinunder with reference to the accompanying drawings.

Figure 1:
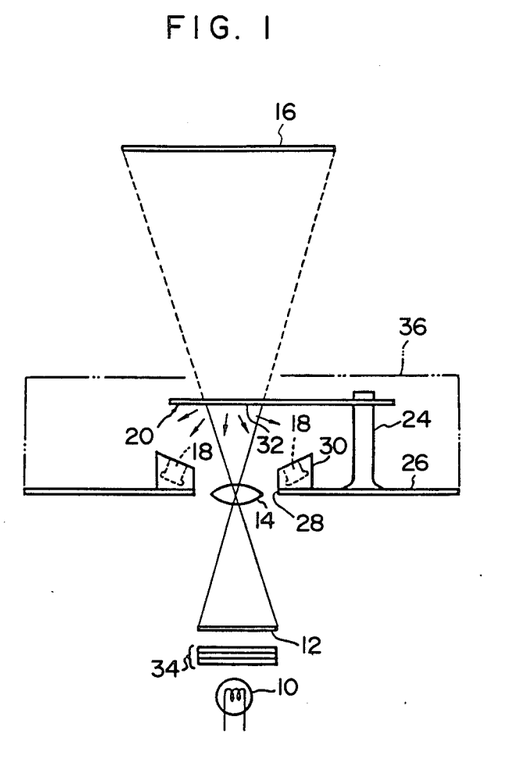
FIG. 1 schematically shows a first embodiment of the photographic printing apparatus according to the present invention.

Referring first to FIG. 1, which shows a first embodiment of the invention, a negative film 12 is disposed between a light source 10 and an enlarging lens 14, and an image on the negative film 12 is formed on color photographic paper 16 which is disposed above the enlarging lens 14. A shutter 20 is disposed above the enlarging lens 14 (on the side of the enlarging lens 14 which is closer to the photographic paper 16), whereby it is possible to control the quantity of exposure light which is to be applied to the photographic paper 16. One end portion of the shutter 20 is pivotally supported by a pole 24 which is turned by a rotary solenoid (not shown), thereby allowing the shutter 20 to effect its opening and closing operation. The pole 24 is disposed such as to project from the upper surface of a base plate 26 which is located within the substantially same plane as the enlarging lens 14.

Figure 2:
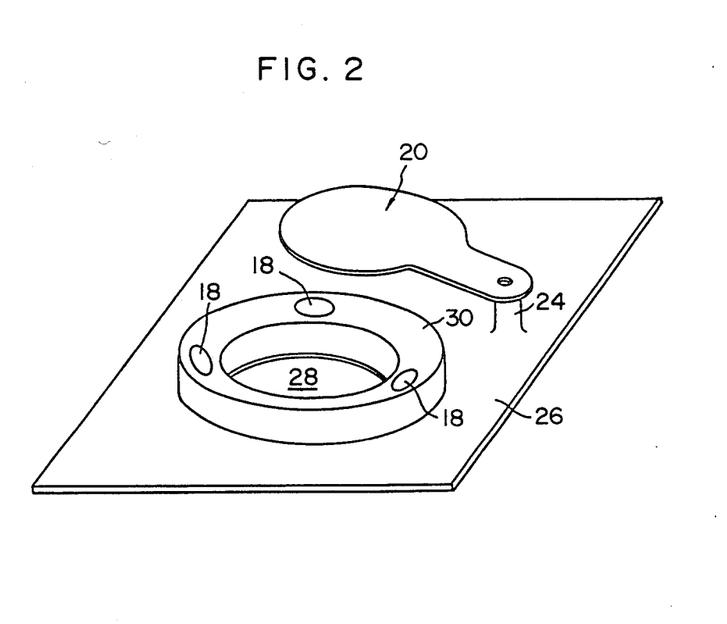
FIG. 2 is a perspective view of light receivers, a shutter and so forth which are mounted on a base plate employed in the embodiment shown in FIG. 1.

As also shown in FIG. 2, a ring frame 30 is secured to the peripheral edge of an opening 28 which is formed in the base plate 26 and in which the enlarging lens 14 is interposed. Three light receivers 18 which respectively correspond to the three primary colors are disposed on the ring frame 30 at equal distances. The upper end surface of the ring frame 30 is slanted in such a manner that the respective axes of the light receivers 18 extend toward the central portion of the shutter 20.

The lower surface of the shutter 20 (i.e., the surface of the shutter 20 on the side thereof which is closer to the light receivers 18) is constituted by a non-specular surface 32 which is, for example, formed by attaching a sheet of white paper with a rough surface to the lower surface of the shutter 20, or by roughing the lower surface of the shutter 20 and then plating the thus formed rough surface with silver.

It is to be noted that cut-off filters 34 which respectively correspond to the three primary colors are disposed between the negative film 12 and the light source 10. Further, the light receivers 30 are shielded from light as shown by the two-dot chain line 36 in FIG. 1.

The following is a description of the operation of the embodiment arranged as above.

When the shutter 20 is in its closing position, the light from the light source 10 which has passed through the negative film 12 and the enlarging lens 14 is reflected by the non-specular surface 32 and enters the light receivers 18. From the quantities of light respectively received by the three light receivers 18, the film density is obtained for each of the three primary colors, thereby determining the cut-off time for each of the cut-off filters 34 for respective colors and the opening time (exposure time) of the shutter 20. Then, the shutter 20 is opened to expose the color photographic paper 16. During the exposure, the light of each of the specific colors is cut off by the cut-off filters 34 for the determined periods of time. Thus, the exposure is completed.

Figure 3:
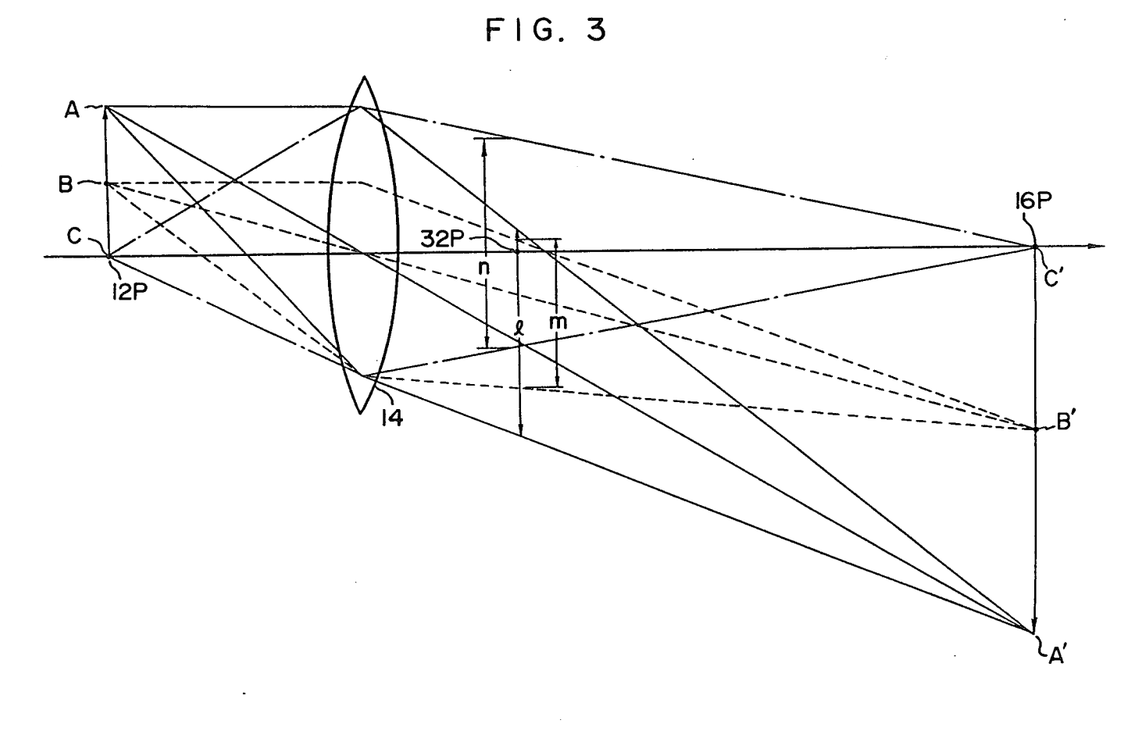
FIG. 3 illustrates how light forms an out-of-focus image.

The light striking on the non-specular surface 32 forms an out-of-focus image thereat. More specifically, as shown in FIG. 3 (in which the positions corresponding to the negative film 12, the photographic paper 16 and the non-specular surface 32 are respectively represented by the reference numerals 12P, 16P and 32P), the light rays passing through an image on the negative film 12 at points A, B and C respectively form images at points A′, B′ and C′ on the photographic paper 16. However, at the non-specular surface 32, the above-described light rays are diverged such as to have widths l, m and n, and moreover, these diverged light rays with the widths l, m and n overlap each other. Accordingly, by measuring these light rays which form an out-of-focus image, it is possible to measure an averaged density of a film image. The density thus measured is hardly affected by the disposition (directional orientation) of the light receivers 18. Moreover, in this embodiment, the reflective surface is constituted by a non-specular surface. It is therefore possible to measure a farther averaged density of a film image.

A second embodiment of the present invention will now be described.

Figure 4:
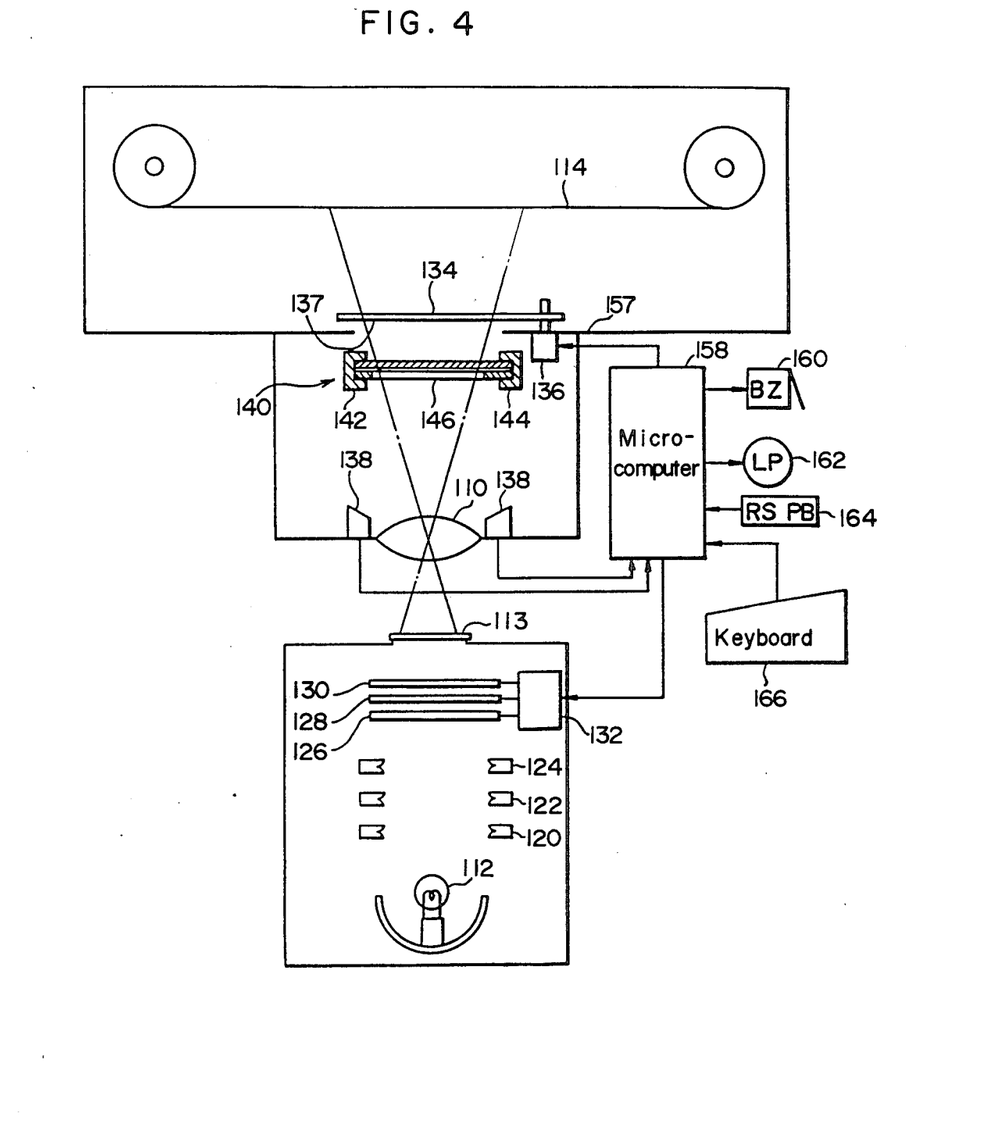
FIG. 4 schematically shows a second embodiment of the photographic printing apparatus according to the present invention.

Referring to FIG. 4, the second embodiment is arranged such that a color negative film 113 is disposed between an enlarging lens 110 and a light source 112, and the image of the negative film 113 is formed and printed on color photographic paper 114 by means of exposure light. Between the light source 112 and the color negative film 113 are disposed cyan, magenta and yellow compensating filters 120, 122 and 124 and cut-off filters 126, 128 and 130, which respectively correspond to red, green and blue. The cut-off filters 126, 128 and 130 are respectively driven by rotary solenoids 132. A shutter 134 is disposed between the enlarging lens 110 and the photographic paper 114, the shutter 134 being driven by a rotary solenoid 136. More specifically, the shutter 134 is adapted such that it is opened against the biasing force of a return spring (not shown) by exciting the rotary solenoid 136 and is closed by means of the biasing force of the return spring by de-energizing the rotary solenoid 136. The shutter 134 is provided on its lower surface (the surface of the shutter 134 on the side thereof which is closer to the film 113) with a reflective surface 137 (a specular surface or a non-specular surface). Three light receivers 138 which respectively correspond to red, green and blue are disposed around the outer periphery of the enlarging lens 110 in such a manner that the light receivers 138 are shielded from ambient light. A print mounting section 140 is disposed below the shutter 134 in close proximity thereto.

Figure 5:
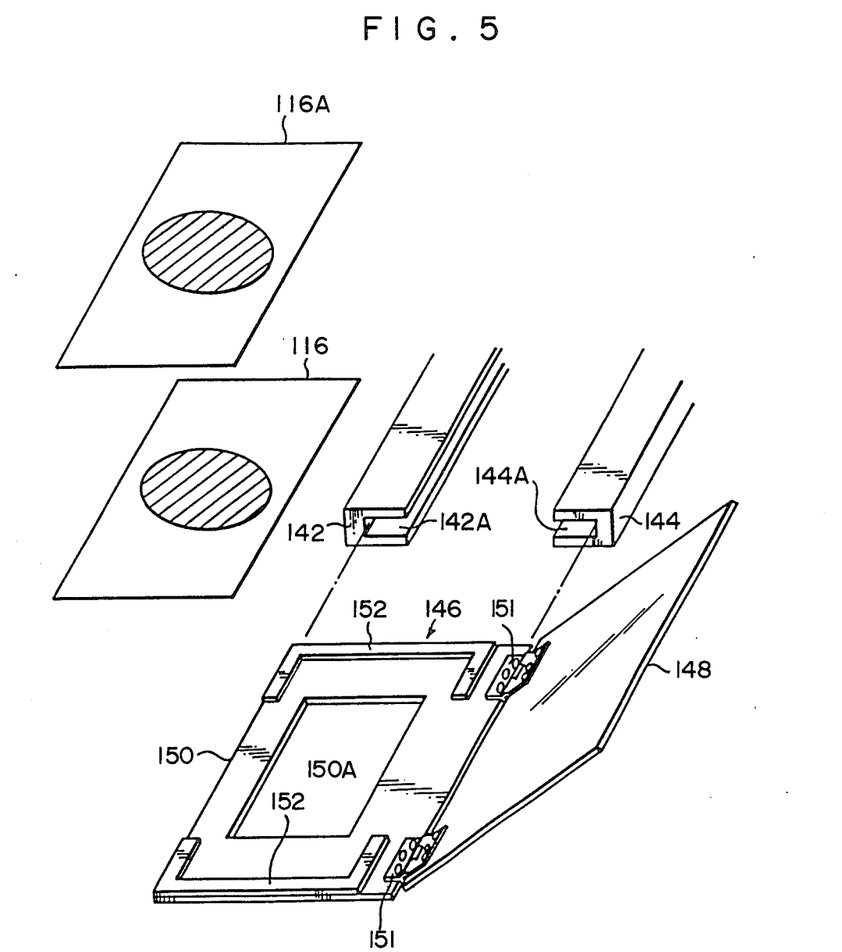
FIG. 5 is a perspective view of a print mounting section in the embodiment shown in FIG. 4.

The print mounting section 140 is arranged as shown in FIG. 5. More specifically, parallel rails 142 and 144 are disposed outside the optical path of exposure light in such a manner that grooves 142A and 142B which are respectively formed in the rails 142 and 144 oppose each other. The lateral edge portions of an insertion means 146 are removably fitted into the respective grooves 142A and 142B. The insertion means 146 is constituted by rectangular upper and lower plates 148 and 150 which are connected together at one end of each of them by means of hinges 151. The lower plate 150 has an opening 150A formed in its central portion. U-shaped frame members 152 which are formed from permanent magnets are secured to the longitudinal edge portions of the lower plate 150 in such a manner as to oppose each other. The frame members 152 are used to position a print 116 and to hold the upper plate 148 on the lower plate 150 by means of magnetic attraction.

The operation of the apparatus arranged as above is controlled by a microcomputer 158 which is equipped with input and output interfaces, as shown in FIG. 4. The microcomputer 158 is supplied with input signals which are respectively delivered from the light receivers 138. Thus, it is possible by the microcomputer 158 to measure the transmission density of the color negative film 113 and the reflection density of the print 116 (see FIG. 5) loaded on the print mounting section 140. It is also possible to check the opening and closing operation of the shutter 134. If an abnormal operation of the shutter 134 is found, the microcomputer 158 outputs alarm signals to a buzzer 160 and a lamp 162. It is possible for these alarm signals to be reset by a signal delivered from a reset switch 164. Further, the microcomputer 158 is also adapted to be able to correct the quantity of exposure light on the basis of an input signal delivered from a keyboard 166.

The operation of the second embodiment arranged as above will now be described.

Figure 6:
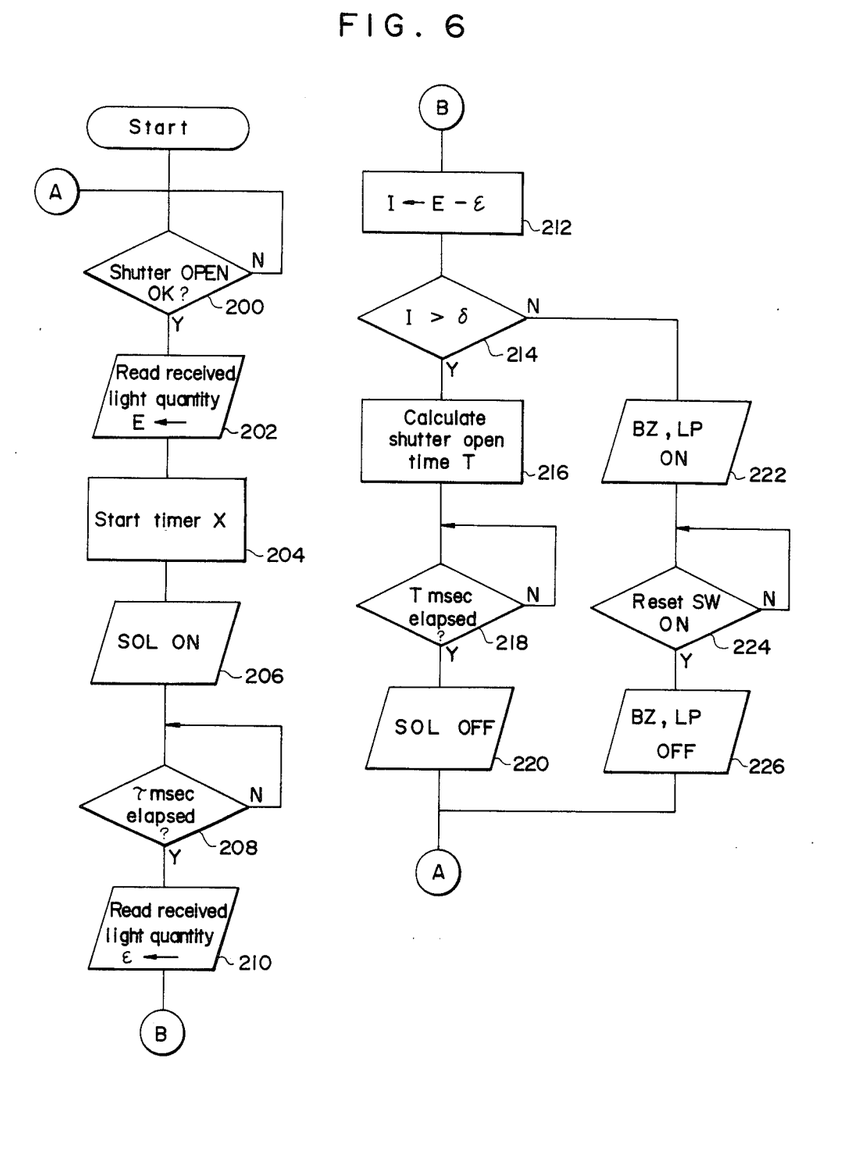
FIG. 6 is a flow chart which shows a control flow.
Figure 7:
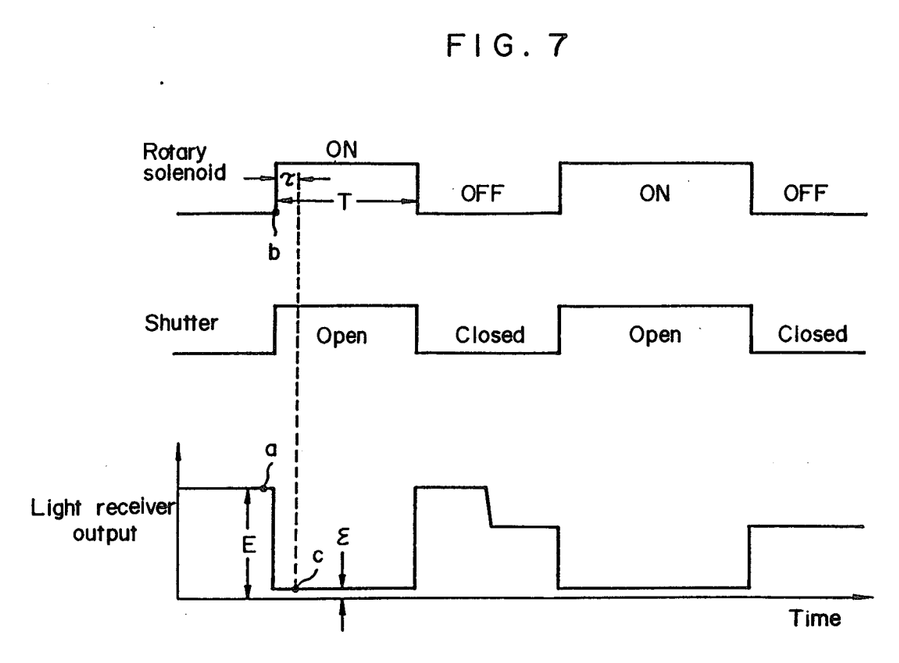
FIG. 7 is a time chart which corresponds to the control flow.

The following is an explanation of a flow chart (shown in FIG. 6) of the control effected by the microcomputer 158 with reference to a time chart which is shown in FIG. 7. It is to be noted that each of the steps in the flow chart, for example, "(a step 200)", will be referred to simply as "(200)", hereinunder. In addition, for the purpose of simplification, the three light receivers 138 are represented by one light receiver 138, and description of the control of the cut-off filters 122, 124 and 126 is omitted.

After preparation for opening the shutter 134 has been completed (200), the quantity of light received by the light receiver 138 is read (see a in FIG. 7) and is set as a value E (202). Then, a timer X is started (204), and the rotary solenoid 136 is turned ON (see b in FIG. 7) so as to open the shutter 134 (206). Then, after $\tau$ msec (a period of time which is slightly longer than a period of time required for the shutter 134 to be completely opened, e.g., 30 msec) has elapsed (208), the quantity of light received by the light receiver 138 is read again (see c in FIG. 7) and is set as a value ϵ (210). This ϵ is an offset value. $I=E-\epsilon$ is calculated (212), and the quantity of light received is thereby compensated for.

Thus, it is possible to accurately read off a quantity of light received even if the offset value of the light receiver 138 changes with a change in the ambient temperature.

When $I>\delta$ ($\delta$ is a constant), that is, when the operation of the shutter 134 is normal (214), a shutter opening time (a period of time from the time when the solenoid 136 is turned ON to the time when it is turned OFF) T is calculated from the value of I (216). The value of T is sufficiently larger than the time required for processing the steps 208 to 216. When the timer X which has been started in the step 204 tells the elapse of T msec (218), the rotary solenoid 136 is turned OFF (220). Then, the process returns to the top step 200, and the above-described processing is repeated thereafter.

If $I \leq \delta$ in the step 214, that is, if the difference between E and ϵ is below a predetermined value δ, it may be considered that the shutter 134 is not totally opened. In such a case, the buzzer 160 is sounded, and the lamp 162 is turned ON, thereby informing the operator that the operation of the shutter 134 is abnormal (222). After the operator has confirmed the abnormal operation of the shutter 134 and has turned ON the reset switch 164 (224), the buzzer 160 and the lamp 162 are turned OFF (226). Then, the process returns to the top step 200.

Thus, it is possible to easily detect an abnormal operation of the shutter 134.

It is to be noted that, in practice, cut-off time for color compensations effected by the cut-off filters is also calculated in the step 216, and the control of the cut-off filters is also carried out between the steps 216 and 218.

Further, taking a very small amount of light entering the light receiver 138 when the shutter 134 is opened, a very small value Δ which is proportional to the luminous intensity of the light source 112 may be further subtracted from the value E in the step 206. The value Δ may be calculated from an experimental formula representing the value of δ with respect to the value of E which is read every time the above-described processing is executed.

The following is a description of exposure compensation effected for the purpose of producing a target print (serving as a reference).

As shown in FIG. 5, the print 116 is sandwiched between the upper and lower plates 148 and 150 of the insertion means 146 in a state wherein the surface of the print 116 on which an image has been formed faces downwardly, and the insertion means 146 is fitted between the rails 142 and 144. The print 116 is formed by printing the color negative film 113 carrying a reference original picture on the photographic paper 114 by the use of the photographic printing apparatus when it is in an optimal state. The print 116 is referred to as a "target print". Then, the keyboard 166 is actuated, and the reflection density of the print 116 is measured by the light receiver 138. Then, in place of the target print, a print 116A is loaded on the print mounting section 140 in a manner similar to the above, the print 116A being formed by printing a reference original picture on the photographic paper 114 by the use of the photographic printing apparatus in present conditions (including the development condition). Then, the keyboard 166 is actuated, and the reflection density Y of the print 116A is measured by the light receiver 140. The microcomputer 158 calculates an exposure compensation value F (X, Y) from the measured reflection densities X and Y. It is possible by this new compensation to produce a target print under present conditions of the photographic printing apparatus.

The above-described compensation value is an exposure compensation value which is employed to produce an optimal print under present conditions.

It is also possible to measure or examine the state of a print under present conditions of the photographic printing apparatus without employing a color negative film carrying a reference original picture. More specifically, the color compensating filters 120, 122 and 124 are actuated such as to form reference light, and photographic paper is exposed to this reference light and photographically processed to form a print, which is loaded on the print mounting section 140, and the reflection density of the print is measured. The measured value is compared with a predetermined value which has been stored in a memory means, or a value obtained by measuring the reflection density of a reference (obtained by the photographic printing apparatus when it is in an optimal state in a manner similar to the above) loaded on the print mounting section 140, whereby it is possible to calculate an exposure compensation value.

Thus, it is possible to obtain an optimal print under present conditions of the photographic printing apparatus by setting up the apparatus on the basis of the calculated exposure compensation value.

What is claimed is:

1. A photographic printing apparatus for printing an image formed on a negative film on photographic paper by means of an exposure light source, which comprises:
    (a) a shutter disposed between said photographic paper and a lens employed to print said film image on said photographic paper by means of exposure light;
    (b) a reflective surface provided on the surface of said shutter on the side thereof which is closer to said lens, said reflective surface comprising a non-specular surface;
    (c) a light receiver disposed outside the optical path of the exposure light in such a manner as to face said reflective surface and adapted to receive, when said shutter is closed, the light which is reflected from said reflective surface, said light forming an out-of-focus image at said reflective surface; and
    (d) control means connected to said light receiver and a keyboard which is actuated by an operator, said control means receiving signals from said light receiver and said keyboard,
    whereby it is possible to measure an averaged density of said film image.

2. A photographic printing apparatus according to claim 1, further comprising light-shielding means which prevents any ambient light from entering said light receiver.

3. A photographic printing apparatus according to claim 2, wherein said light receiver is disposed on a ring frame which is secured to a base plate along the peripheral edge of an opening formed therein, said lens being interposed in said opening.

4. A photographic printing apparatus according to claim 3, wherein there are three of said light receivers disposed on said ring frame at equal distances, said light receivers respectively corresponding to red, green and blue.

5. A photographic printing apparatus according to claim 1, wherein said control means includes shutter operation checking means which checks the operation of said shutter in accordance with a shutter operation check start signal from said keyboard and a signal from said light receiver.

6. A photographic printing apparatus according to claim 5, wherein said shutter operation checking means includes alarm means which informs the operator of an abnormal shutter operation when said shutter malfunctions.

7. A photographic printing apparatus according to claim 1, wherein said control means includes received light quantity compensating means which compensates for an output signal delivered from said light receiver on the basis of a value represented by a signal which is delivered from said light receiver when said shutter is opened and/or when said light source is turned OFF.

8. A photographic printing apparatus according to claim 1, further comprising a print mounting section disposed between said reflective surface and said light receiver, said control means including exposure compensating means which compensates for an amount of exposure on the basis of a signal from said light receiver which receives the light reflected from a reference original picture, or a sheet of photographic paper which has been exposed to reference light and photographically processed, said reference original picture or said photographic paper photographically processed being placed on said print mounting section.

9. A photographic printing apparatus according to claim 8, wherein said print mounting section includes a pair of parallel rails disposed such as to oppose each other across the optical path of the exposure light and respectively having grooves which oppose each other, and insertion means which has an opening formed in its central portion and is adapted to clamp said reference original picture or said photographic paper photographically processed and to be fitted into the grooves of said rails.

10. A photographic printing apparatus according to claim 1, wherein said non-specular surface is constituted by a sheet of white paper with a rough surface which is attached to the surface of said shutter on the side thereof which is closer to said lens.

11. A photographic printing apparatus according to claim 1, wherein said non-specular surface is formed by roughing the surface of said shutter on the side thereof which is closer to said lens and then plating the roughed surface with silver.

12. A photographic printing apparatus for printing an image formed on a color negative film on photographic paper by means of an exposure light source, which comprises:
(a) a shutter disposed between said photographic paper and an enlarging lens employed to print said film image on said photographic paper by means of exposure light;
(b) a reflective surface provided on the surface of said shutter on the side thereof which is closer to said lens;
(c) a light receiver disposed outside the optical path of the exposure light in such a manner as to face said reflective surface and adapted to receive, when said shutter is closed, the light which is reflected from said reflective surface, said light forming an out-of-focus image at said reflective surface; and
(d) control means connected to said light receiver and a keyboard which is actuated by an operator, said control means being adapted to receive signals respectively delivered from said light receiver and said keyboard, thereby controlling the operation of said shutter,
whereby it is possible to measure an averaged density of said color film image.

13. A photographic printing apparatus according to claim 12, wherein said reflective surface is constituted by a non-specular surface.

14. A photographic printing apparatus according to claim 13, further comprising light-shielding means which prevents any ambient light from entering said light receiver.

15. A photographic printing apparatus according to claim 14, wherein said light receiver is disposed on a ring frame which is secured to a base plate along the peripheral edge of an opening formed therein, said lens being interposed in said opening.

16. A photographic printing apparatus according to claim 15, wherein there are three of said light receiver disposed on said ring frame at equal distances, said light receivers respectively corresponding to red, green and blue.

17. A photographic printing apparatus according to claim 12, wherein said control means includes shutter operation checking means which checks the operation of said shutter in accordance with a shutter operation check start signal from said keyboard and a signal from said light receiver.

18. A photographic printing apparatus according to claim 17, wherein said shutter operation checking means includes alarm means which informs the operator of an abnormal shutter operation when said shutter malfunctions.

19. A photographic printing apparatus according to claim 13, wherein said control means includes received light quantity compensating means which compensates for an output signal delivered from said light receiver on the basis of a value represented by a signal which is delivered from said light receiver when said shutter is opened and/or when said light is turned OFF.

20. A photographic printing apparatus according to claim 13, further comprising a print mounting section disposed between said reflective surface and said light receiver, said control means including exposure compensating means which compensates for an amount of exposure on the basis of a signal from said light receiver which receives the light reflected from a reference original picture, or a sheet of photographic paper which has been exposed to reference light and photographically processed, said reference original picture or said photographic paper photographically processed being placed on said print mounting section.

21. A photographic printing apparatus according to claim 20, wherein said print mounting section includes a pair of parallel rails disposed such as to oppose each other across the optical path of the exposure light and respectively having grooves which oppose each other, and insertion means which has an opening formed in its central portion and is adapted to clamp said reference original picture or said photographic paper photographically processed and to be fitted into the grooves of said rails.

22. A photographic printing apparatus according to claim 13, wherein said non-specular surface is constituted by a sheet of white paper with a rough surface which is attached to the surface of said shutter on the side thereof which is closer to said lens.

23. A photographic printing apparatus according to claim 13, wherein said non-specular surface is formed by roughing the surface of said shutter on the side thereof which is closer to said lens and then plating the roughed surface with silver.

* * * * *